(12) United States Patent
Hussie

(10) Patent No.: US 7,136,074 B2
(45) Date of Patent: Nov. 14, 2006

(54) METHOD AND SYSTEM OF IMPROVED COLOR SELECTION

(75) Inventor: Andrew F. Hussie, Miami, FL (US)

(73) Assignee: Master Colors, Santa Barbara, CA (US)

( * ) Notice: Subject to any disclaimer, the term of this patent is extended or adjusted under 35 U.S.C. 154(b) by 41 days.

(21) Appl. No.: 10/909,570

(22) Filed: Aug. 2, 2004

(65) Prior Publication Data

US 2006/0022994 A1    Feb. 2, 2006

(51) Int. Cl.
*G09G 5/02* (2006.01)

(52) U.S. Cl. ....................................... 345/591

(58) Field of Classification Search ................. 345/591, 345/593, 617
See application file for complete search history.

(56) References Cited

U.S. PATENT DOCUMENTS

| | | | |
|---|---|---|---|
| 4,794,382 A | 12/1988 | Lai et al. | |
| 5,311,212 A | 5/1994 | Beretta | |
| 5,416,890 A * | 5/1995 | Beretta | 345/590 |
| 6,034,667 A * | 3/2000 | Barrett | 345/603 |
| 6,081,253 A | 6/2000 | Luke et al. | |
| 6,226,010 B1 | 5/2001 | Long | |
| 2004/0056867 A1* | 3/2004 | Cui et al. | 345/590 |
| 2005/0280845 A1* | 12/2005 | Hussie | 358/1.9 |

\* cited by examiner

*Primary Examiner*—Kee M. Tung
*Assistant Examiner*—Greg F. Cunningham
(74) *Attorney, Agent, or Firm*—Robert Schuler

(57) ABSTRACT

A general purpose computer system is used to run a color selection application which operates to facilitate the selection of colors and the automatic generation of palettes of harmonious colors. The application is implemented in three pages, a color selection page, a results manager page, and a color composition page. The color selection page is used to select a plurality of colors that the results manager page can operate on to generate palettes of harmoniously related colors. The color composition page is used to experiment with the colors selected and palettes generated in order to arrive at a pleasing arrangement of colors. The results manager page contains functions and palette characteristics that an artist can specify in order to automatically generate palettes that contain groups of colors that have very specific contrast relationships to previously selected colors.

10 Claims, 9 Drawing Sheets

METHOD AND SYSTEM OF IMPROVED COLOR SELECTION

FIELD OF THE INVENTION

This invention is generally related to computer implemented methods for selecting colors for a color palette utilized by an artist to create a color image. More specifically, this invention relates to a color selection method and system that uses a perceptually ordered color space and automatically applies contrast relationships to the color selection process in order to facilitate the selection of harmonic colors for an image.

BACKGROUND OF THE INVENTION

Prior to the adoption of computers for the purpose of selecting colors to be used in the creation of color images, artists employed a physical palette upon which to place and mix colors used in the image creation process. The individual skill and aptitude of the artist dictated how quickly they would be able to select colors for their palette. Specifically, the degree to which an artist possessed a practical and theoretical knowledge of how colors work together usually dictated how quickly they would be able to select colors for their palette and how quickly and accurately they would be able to mix these selected colors in a manner that ensured they harmonized together when applied to the creation of an image.

An improvement to the manual operation of selecting and mixing colors on a physical palette came with the availability of accurate color charts, such as the charts developed and sold by Pantone, Inc. Unfortunately, these color charts contained hundreds or thousands of colors from which the artist could select to create their palette. Selecting and harmonizing colors from such a large assortment of colors takes quite a bit of time.

With the advent of computers, artists realized that software could be designed that would automatically apply color theory to the color selection process thereby making the process of color selection and harmonization much more efficient as well as accurate. One such application of computer software to the color selection process is disclosed in U.S. Pat. No. 4,794,382 entitled, "Image Retouching". This patent discusses a two-step method for arriving at an accurate choice of tint that can be used to modify or retouch an existing color in a color image. The first step of the method involves identifying and displaying a coarse range of colors and the second step of the method involves selecting one of the colors in the coarse range and displaying a fine range of colors, centered on the selected color. The coarse range represents a group of colors with adjacent colors differing from each other by more than a predetermined amount. The fine range represents a group of colors with adjacent colors differing from each other by less than the predetermined amount. The color ranges are displayed on a computer monitor as a continuous line of individual colors. The manner that these color ranges are selected is described with reference to FIG. 1. Further, the patent discloses that the characteristics of the color in each of the ranges can be changed. So, for instance, the intensity of the colors can be changed. One of the deficiencies with this method is that the color space that is available from which to select colors is a non-perceptual color space. Non-perceptual color spaces are designed to accommodate the needs of display devices, such as a computer monitor or printer, and as such are not good tools for artists to use when selecting colors for their palette.

U.S. Pat. No. 5,311,212 entitled, "Functional Color Selection System" discloses a system for automatically generating a palette of coordinated, harmonious, and aesthetically pleasing colors by symmetrically manipulating colorimetrically specified colors in a perceptually uniform color space. Specifically, a user selects a single "key color" which the color selection system then uses to generate one or more "analogous harmony" colors all of which reside on a single plane in the color space. The method used to select harmonizing colors is described with reference to FIG. 5. In addition to the system selecting harmonizing colors, it is also able to generate contrasting harmonies, as described with reference to FIG. 6, and lightness and chroma variation colors as described with reference to FIG. 8. Also, the user may vary the hue of the entire palette by a fixed amount to view the harmonious palette in different hues. The method described in this patent improves upon the method of the U.S. Pat. No. 4,794,382 patent in that a perceptually uniform color space from which colors are selected is employed. While existing perceptually uniform color spaces have been designed to exhibit colors that are related to each other in an organized and logical manner, from the perspective of the human eye, the relationships between the colors in existing perceptual color spaces, such as the Munsell or CIELAB color spaces, are not as consistent as they need to be in order for computer software to accurately measure contrast between colors which is a requirement for generating accurate color palettes. Another limitation of the method disclosed by the -212 patent is that all of the colors on any of the individual palettes created by this color selection system reside in a single plane in the color space, therefore only providing the artist with a two-dimensional solution which artificially limits the color selection process.

U.S. Pat. No. 6,081,253 entitled, "Method for Generating Numerous Harmonious Color Palettes from Two Colors" discloses method for the creation of color palettes based on the initial selection by the artist of two colors from a perceptual color space, such as CIELAB. The patent describes how to derive equations that define planes that pass through an axis formed by the two selected colors. The planes defined by the derived equations will always contain harmonious color groups since the natural, perceptual relationship between the colors on a plane is preserved.

U.S. Pat. No. 6,226,010 entitled, "Color Selection Tool" discloses a method for generating a blend of colors between two initially selected colors. Essentially, an artist selects an initial color and then selects another color at some distance from the initial color. The tool then generates the intermediate or blend colors that represents all of the colors in a straight line, assuming CIELAB color space, between the initially selected color and the first selected color. The artist can continue to select a second, third, etc. color at some distance from the initial color and create a palette of colors that is displayed in circular fashion as FIG. 1 illustrates.

Both of the methods for selecting colors for a color palette disclosed by the U.S. Pat. Nos. 6,081,253 and 6,226,010 patents suffer from the same limitations as the method of the U.S. Pat. No. 5,311,212, namely the inaccuracy injected into the process by the perceptual color spaces used and the limitation on the artist imposed by a two-dimensional color palette. The manner in which colors are selected for a palette in the prior art is further limited to a straight line between two colors or to a straight line of color with the selected color in the middle, or to a surface of color that cuts through the plane of a line described by two selected colors. The color harmonies generated for color palettes by these processes tend to be somewhat sparse and creatively confining therefore limiting the efficiency of the artist in the color selection process to the extent that they have to create a number of palettes in gain a full appreciation of the colors available to them. So, for instance, none of the prior art methods for color selection provide the artist with a tool to generate a palette of colors that are only some specified distance in tri-axial color space from a selected color. Still further, nowhere in the prior art is there a tool that provides the artist with a comprehensive and accurate means to automatically generate contrast relationships between a plurality of colors. More specifically, order and visual synchrony or harmony can be brought to any collection of colors by precisely controlling the range or proportional distances between those colors.

Therefore, it would greatly facilitate the process of selecting harmonically related colors if a color selection tool was available to artists that utilized a specially constructed, perceptually ordered color space that facilitates the automatic generation of a palette of colors with very precise contrast relationships. Further, a tool that permits the artist to precisely control contrast relationships between colors would be very useful during the creation of color palettes.

SUMMARY OF THE INVENTION

The limitations of the prior art color selection methods are overcome by my invention which can be implemented on a general purpose computer system that includes both hardware and software. My invention provides a novel method for efficiently selecting colors for a color palette that have precisely defined contrast relationships. At least one color is initially selected from among colors in a perceptually ordered color space, a contrast relationship is specified that operates on the initially selected color to identify colors in the perceptually ordered color space, and these identified colors are displayed. The perceptually ordered color space is a three dimensional color space composed of a hue, value, and chroma axis each of which are opposed in the three dimensional space to each other by ninety degrees. The specified contrast relationship comprises selecting a contrast relationship function and specifying at least one palette characteristic. The selected contrast relationship function can be one of a range function and a proportionality function. The specified palette characteristic is at least one of a range step, a proportionality relationship between three colors, and accuracy.

Detailed Description of the Invention: The entire contents of commonly assigned application Ser. No. 10/862,230 filed Jun. 7, 2004, are incorporated into this application by reference.

My invention, hereinafter referred to as the Color Selector, may be implemented in software and loaded onto a general purpose computer system running any operating system software, for example a Dell™ Dimension™ 4500S computer system running the Micrsoft® Windows XP operating system all sold by the Dell™ Computer Corporation located in Austin, Tex. With reference to FIG. 1, the Color Selector software (6) is initially loaded onto the Host's (10) Disk Sub-System (12). The Color Selector software may reside on a CD or floppy disk or any other portable storage medium suitable for software code. At the time an artist wishes to use the Color Selector software to select colors or to create a color palette, they instruct the Computer System to transfer the software from the Disk Sub-System to the Memory Sub-System (13), where it is made available to the Processor (11) which operates to accept and execute instructions from the artist using the Input Device (7) which could be a mouse and/or a keyboard, for instance. The results of an artist's instructions, as executed by the computer, can be displayed by the CRT (9) or the Printer (8). These results will typically be a set of colors or a palette from which the artist can select colors to create a color image.

Figure 7:
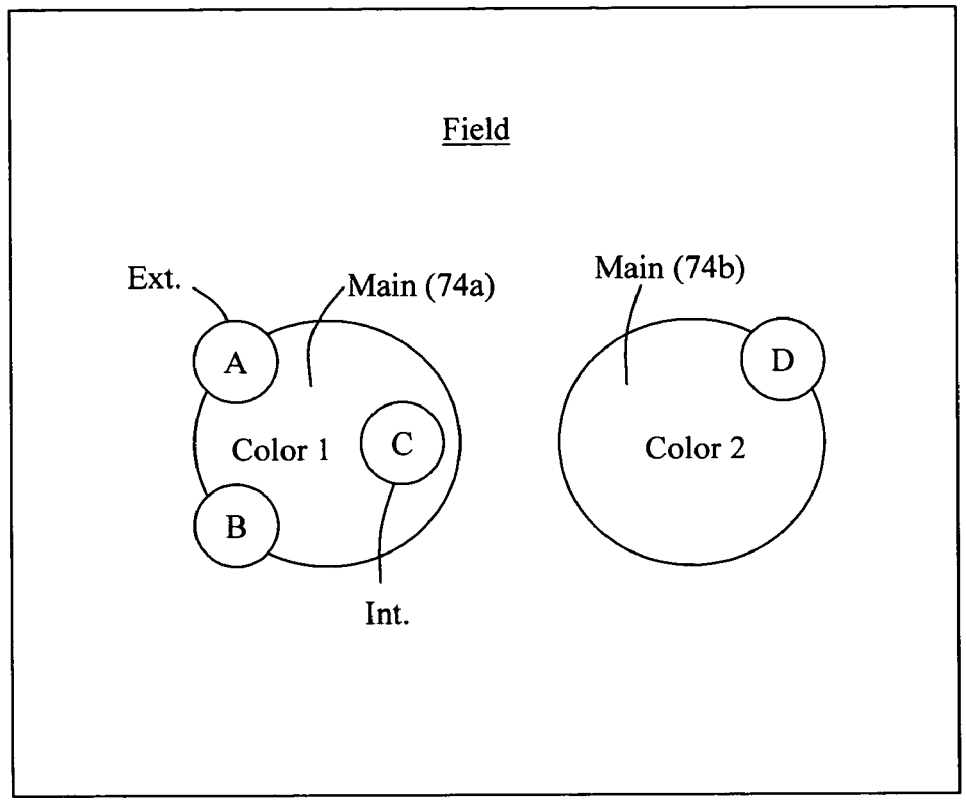
FIG. 7 is an illustration of the Composition Manager Page.
Figure 7:
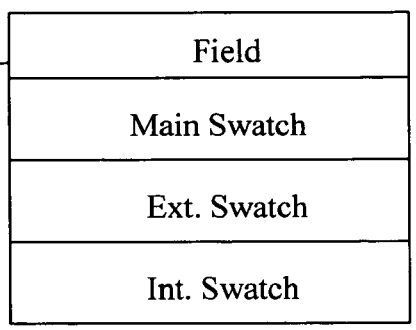
Figure 7:
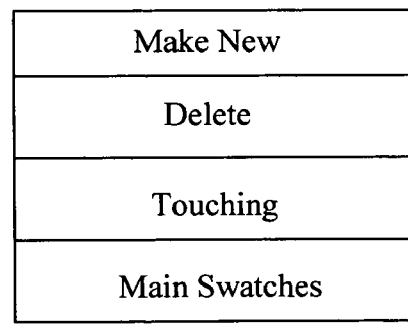

More specifically with reference to the Color Selector software (6) in FIG. 1, this software implements several separate pages of functionality. I have elected to design the Color Selector user interface in a multi-page format, by choice and not by necessity, in order to provide the artist with a logical process for the selection of colors and the creation of a palette. But my invention should not be limited to this multi-page format, as I could just as easily have incorporated all of the Color Selector functionality onto a single page. As mentioned above, the Color Selector (6) incorporates several pages of functionality, namely a Color Selection page (20), a Results Manager page (30), and a Composition Manager page (70). Generally, the Color Selection page, illustrated in FIG. 2, displays a color wheel and hue page from which an artist can select colors they would like to work with on a palette. The Results Manager page, illustrated in FIG. 3, contains functionality that permits an artist to control the contrast relationships between the colors selected for the palette. More specifically, the functions that control these contrast relationships appear as "Find Range" and "Find Proportion" in windows (31) and (32) respectively on the Results Manager page (30) in FIG. 3. This page also displays a Palette (34) that is the result of the artists selecting colors, contrast relationships, and palette characteristics to be applied to the selected colors. The Composition Manager page (70), illustrated in FIG. 7, is used by an artist to arrange color in a composition and to experiment with color harmony using the colors selected from the various palettes that they create on Page (30). Information generated by the Color Selection and Results Manager pages can be easily imported into any of the commercially available image editing and creation tools, such as PhotoShop® Painter sold by Adobe® or a product offered by Corel® under the name Painter™ for instance. The detailed functionality of each of these pages will be described later in this application.

Referring again to FIG. 1, the Color Selector (6) uses a specially modified, perceptually ordered, HVC Color space (3) to facilitate the accurate calculation of color contrast relationships. HVC is an acronym which stands for the Hue, Value, and Chroma axes in a three dimensional color space.

These terms were described in the incorporated application also and so won't be described again here. Fundamentally, perceptually ordered color space means that the axes along which the colors are placed are perpendicular, or the visual characteristic enumerated by one axis has no influence over the visual characteristic enumerated by the other axes. Further, no color may appear more than once within this dimensional structure and the colors must be arranged along the axes in a visually steady and consistent fashion, such that as they progress along their axes representing the magnitude of a certain visual quality, they must be able to be divided into visually equal units of contrast magnitude, referred to hereafter as color contrast steps or simply steps, as perceived by a qualified set of individuals. Although any perceptually ordered color space could be employed to implement my invention, in order for my invention to operate in an optimal manner, I modified a perceptually ordered, HVC color space, hereafter referred to as simply the Modified Color space (3), such that two colors of equal chroma, of 12 steps, and value, on adjacent hue pages, will have a contrast step of one. As the chromas of the two colors approach zero, their color contrast also approaches zero in a linear manner. Further, the Modified Color space is constructed such that the color contrasts between all adjacent colors on the same hue page are the same. The hue page referred to above is described later in this application with reference to FIG. 1e. I will now describe how to implement the Modified Color space with reference to FIGS. 1b, 1c, and 1d.

FIG. (1c) is an illustration of the modified color space (3) which has three axes that represent visual qualities of the three dimensional space. The three axes are hue (Z), value (Y), and chroma (X). Each color within the intermediate color space has unique numerical quantities or magnitudes of hue, value, and chroma. The vertical value axes (Y) identifies the color's lightness, or how light or dark the color is. The higher the value is, the lighter the color. A value of zero (16) tends to be the darkest possible color under the circumstances, or black. The horizontal chroma axes (X) identifies the intensity of a color's hue. The lower the chroma, the less intense the color is, with a chroma of zero (17) being the equivalent of a neutral gray. Higher chroma indicates higher intensity, such as, in the case of a red hue, a very bright red color. As shown in the color wheel of FIG. 1b, hue identifies the color's particular commonly understood color group, i.e., red, yellow, green, blue and the like. The hue axis (Z) is cyclical, that is, it may be increased to the point where it cannot be further from the starting point, and any further increase will bring it closer to the beginning. This cyclical characteristic of hue is analogous to the color spectrum, which progresses from red to yellow to green to blue to violet, back to red.

Figure 1A:
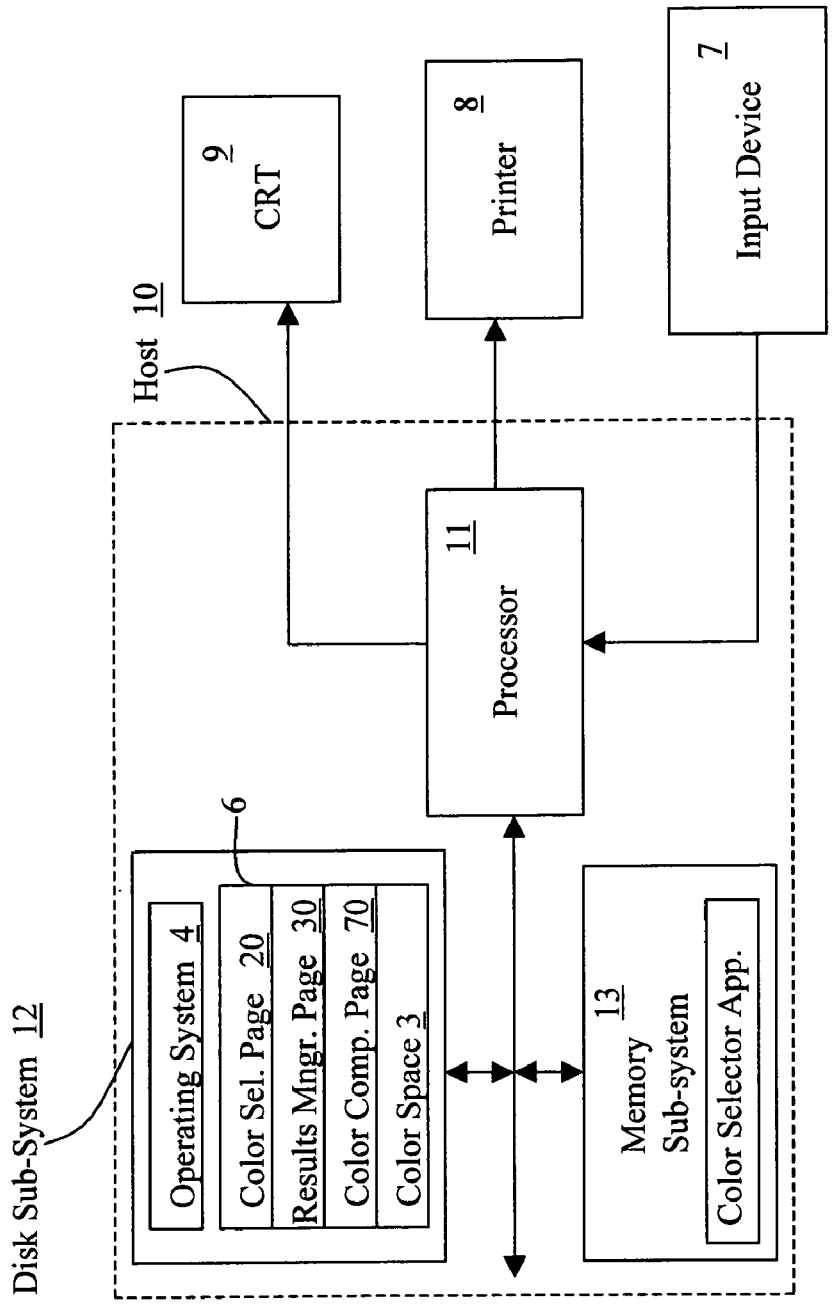
FIG. 1a is a high level block diagram of the computer system incorporating the invention.
Figure 1B:
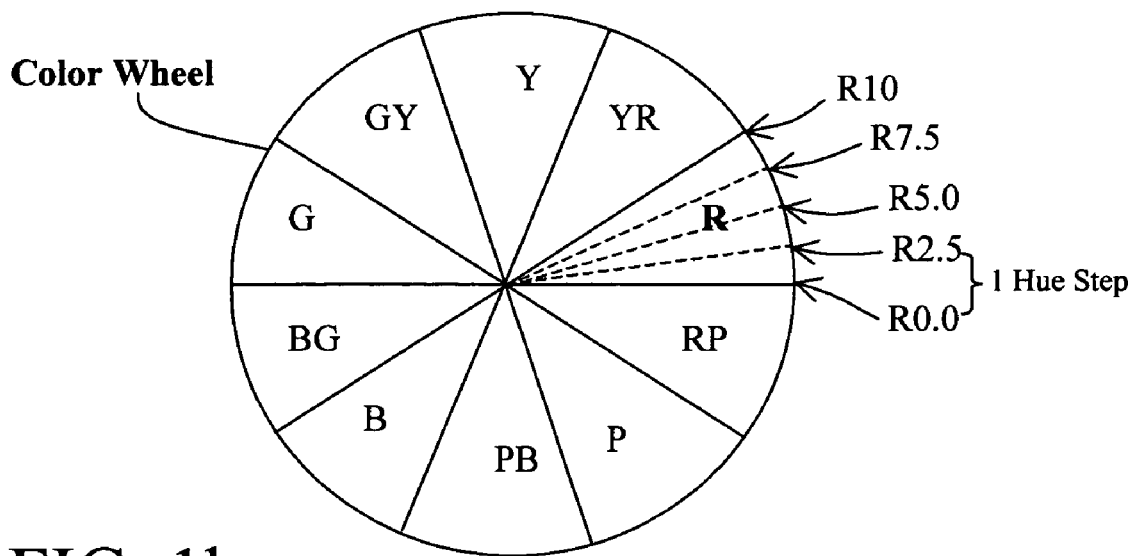
FIG. 1b is a color wheel showing different hues.
Figure 1C:
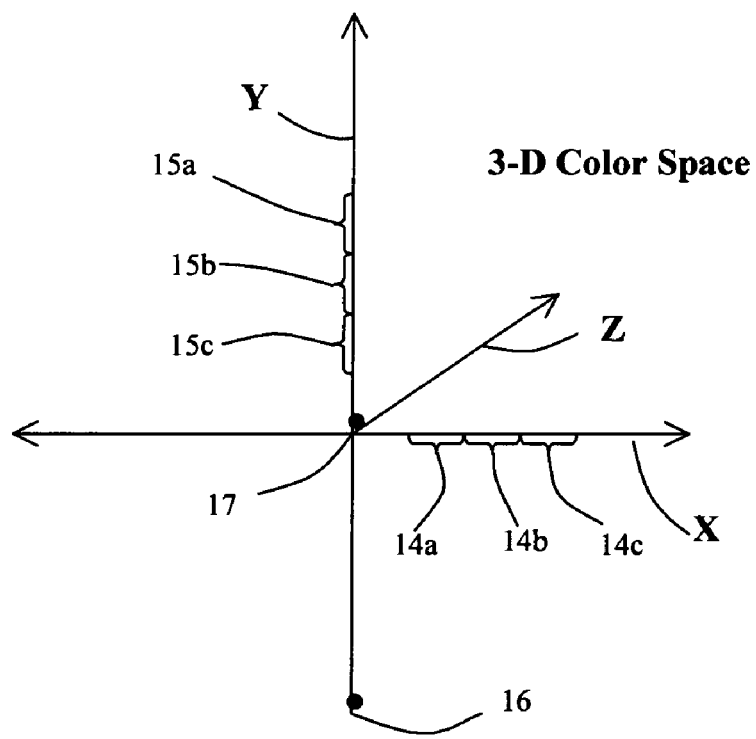
FIG. 1c is an illustration of three dimensional color space.
Figure 1D:
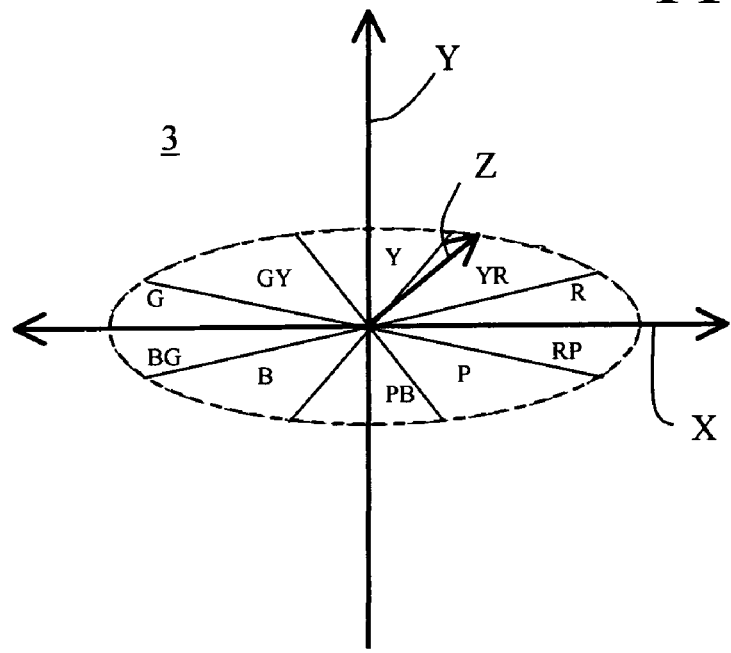
FIG. 1d is an illustration of three dimensional color space with the hue color wheel.
Figure 1E:
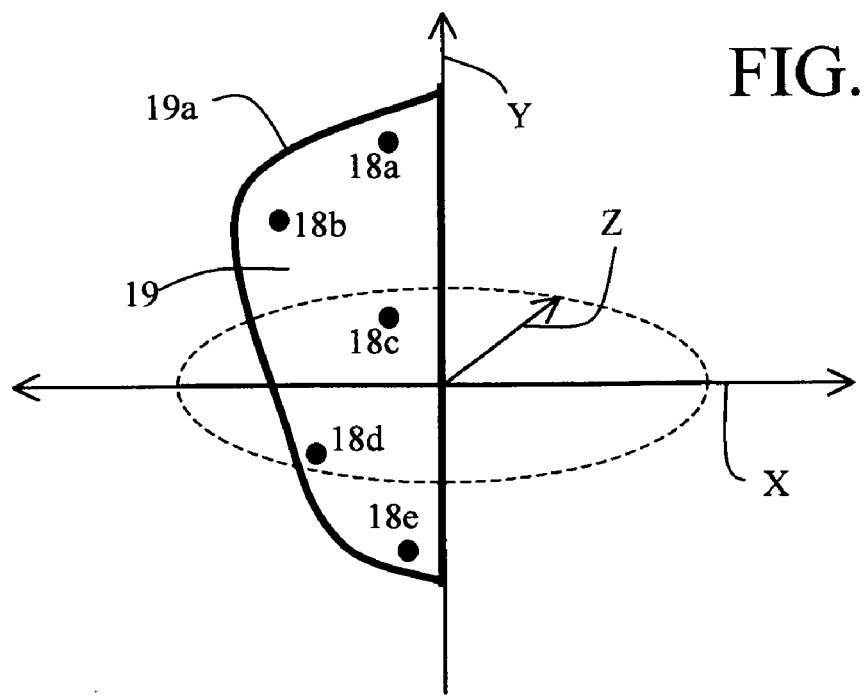
FIG. 1e illustrates a hue page in terms of a modified color space.

While the value and chroma axes shown in FIG. 1c have linear scalar quantities which describe them, i.e., 0, 1, 2, 2.6, 5.96, 20, etc., the hue axis has a special numbering system. With reference to the color wheel of FIG. 1b, hue is divided into 10 groups, or hue names. They are Red (R), YellowRed (YR), Yellow (Y), GreenYellow (GY), Green (G), BlueGreen (BG), Blue (B), PurpleBlue (PB), Purple (P), and RedPurple (RP) (continuing back to Red). These groups are further divided into scalar quantities which indicate the nuance between groups. This quantity lies on a scale of 0 through 10, excluding 0. The notation for a hue's group along with its quantity indicating how close it is to the next group would appear as: R 6.7, GY 0.4, P 9.8 and the like. Other notation formats may have the number appearing before the group and so the color notation would appear as 6.7 R. For the purposes of this description, the former notation will be used. It is common to divide the axis into 40 parts as 4 quantities per 10 groups, appearing as R 2.5, R 5, R 7.5, R 10, YR 2.5, YR 5, YR 7.5, YR 10, etc. FIG. 1d is the combination of FIGS. 1b and 1c and is a three dimensional representation of the modified color space (3). Further with regard to hue, it is convenient at this point to describe the meaning of the term "hue page". Referring to FIG. 1e, you will see the three dimensional color space illustrated without the different hues listed. The two dimensional color space designated (19) is defined by the bold line (19a) and is in the plane of axes Y and Z of the modified color space (3). The five bold dots labeled (18a–e) represent colors in this two dimensional color space. All of the five colors have the same hue, and some of the colors could have the same value or the same chroma, but none of the five colors have the same value and chroma.

The modified color space (3) of FIG. 1d has been laid out such that two colors of equal chroma, of 12 steps, and value, on adjacent hue pages, will have a contrast step of one. As the chromas of the two colors approach zero, their color contrast also approaches zero in a linear manner. So, for example, if the two colors on adjacent hue pages both had chromas of 24, then the color contrast between them would be two. It is not important to set up the modified color space such that two colors on adjacent hue pages both with a chroma equal to 12 are separated by a color contrast of one step. The color space could be constructed so that this one step contrast difference existed at almost any chroma value. Further, the modified color space (3) is constructed such that the color contrasts between all adjacent colors on the same hue page are the same.

Figure 2:
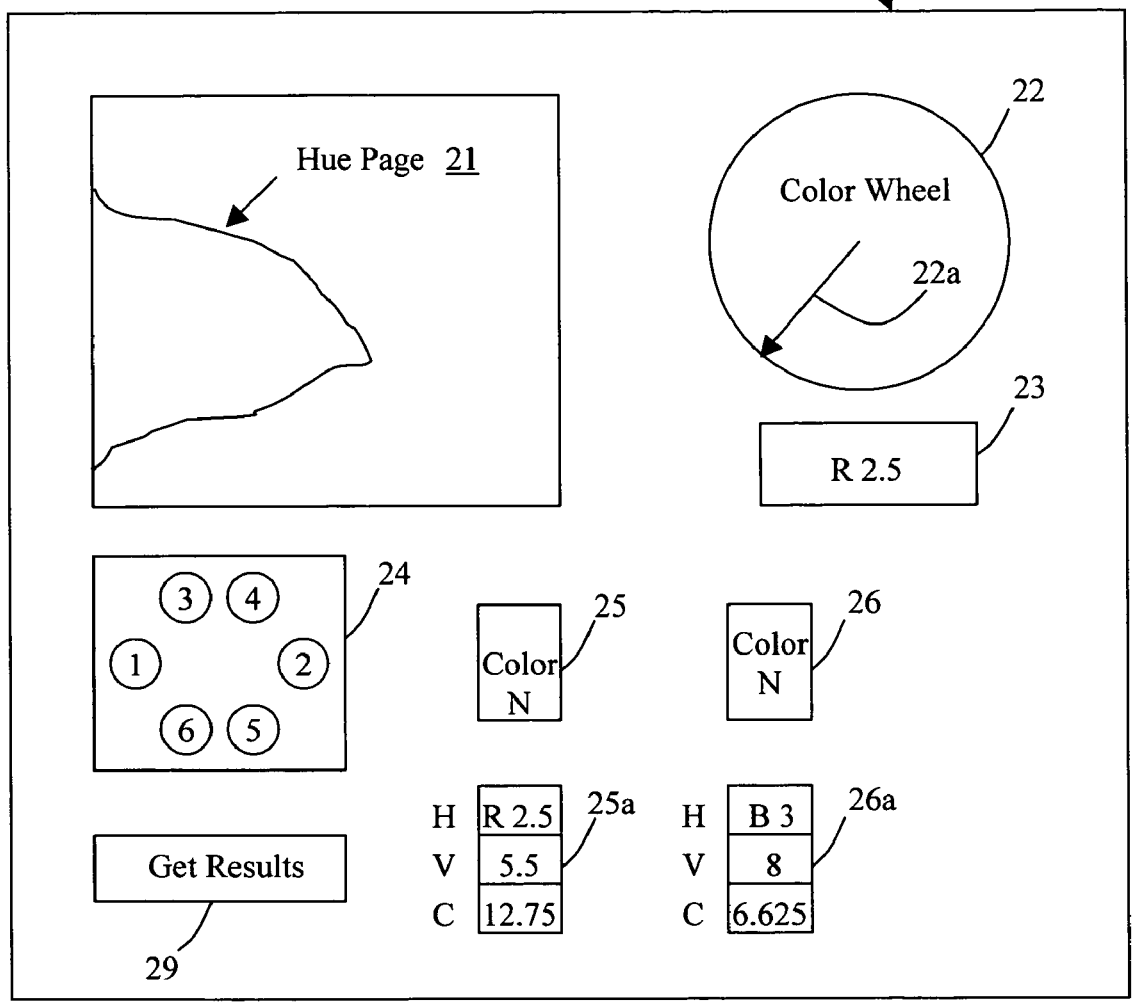
FIG. 2 is an illustration of the Color Selection Page.

As described previously, the functionality of my Color Selector (6) is implemented in three separate pages. With reference to FIG. 2, the Color Selection Page (20) is constructed to permit an artist to select up to six colors for a palette from the modified Color space. Color Wheel (22), Hue Pointer (22a), and Hue Page (21) are used by the artist in order to make these color selections. The colors selected by the artist are stored in memory by the Color Selector application and displayed in Selected Colors window (24) as color circles 1, 2, 3, 4, 5, and 6. Also, I have incorporated two sets of windows, (25) and (25a) and (26) and (26a), into the design of Page (20) that are used to display any two of the selected colors and their HVC values respectively.

Figure 3:
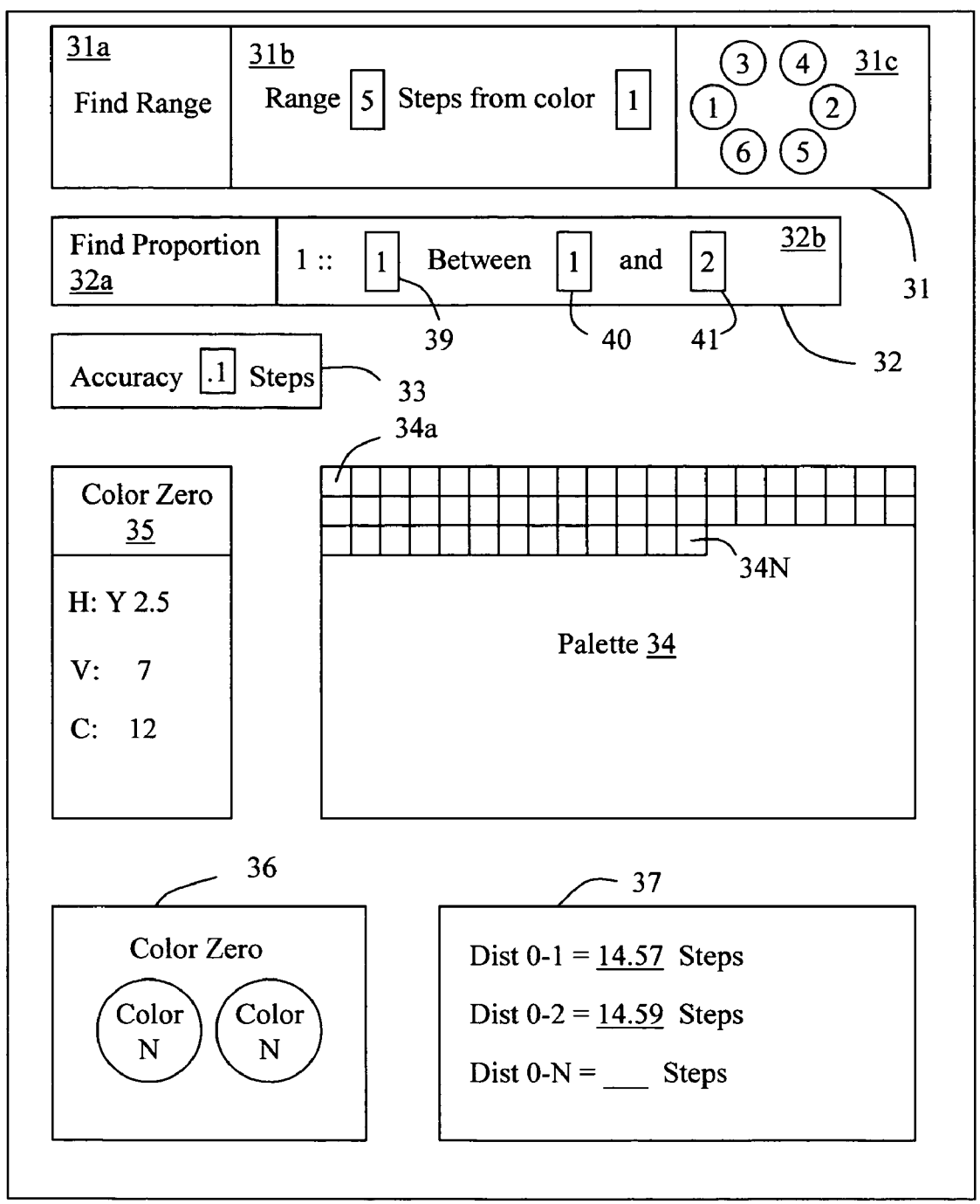
FIG. 3 is an illustration of the Results Manager Page.

With reference to FIG. 3, 1 constructed the Results Manager Page (30) to provide functionality that will enable an artist to efficiently and accurately create a Palette (34) of colors that bears certain contrast relationships to any of the colors selected using the Color Selection Page (20) of FIG. 2. More specifically, an artist can elect to display on the Palette a set of all colors in the color Color space (3) that are a specified contrast distance, or steps, from a color selected using the Color Selection Page. The method used to calculate the contrast distance will be described later in this application. This functionality is called finding the range and it is shown in the window labeled (31a) as "Find Range". Before the "Find Range" function can operate to identify colors for a palette, it is necessary to specify certain palette characteristics. In this case, it is necessary to specify the range in steps from a particular color. The palette characteristic with respect to "Find Range" is specified in window (31b). So, for example, if the artist selects Color 1 from among the six colors illustrated in window (31c) of FIG. 3, specifies a range of five steps from Color 1 in window (31b), and selects the "Get Results" function (29) in FIG. 2, the Color Selector will only return the set of all colors in the Color space that are five steps from Color 1 and display these colors on the Palette (34).

Further with reference to FIG. 3, an artist can elect to display on the Palette the set of all colors in the modified Color space that satisfy a specified proportional relationship between a first and second color selected using the Color Selection Page (20). The function that enables the identification of proportional relationships is called "Find Proportion" and it appears in the window labeled (32*a*) in the Results Manager Page (30). Before the "Find Proportion" function can operate to identify colors for a palette, it is necessary to specify certain palette characteristics in window (32*b*). It is necessary to specify the proportional value by entering a number in the space (39) allotted for this and it is necessary to specify between which two colors the proportional value with be calculated. These colors are entered into spaces (40) and (41). More specifically, if the specified proportional relationship is one to one (1::1), then the distance, in steps, between the first color and a color, termed Color Zero, in the set of all colors in Color space and the second color and the same Color Zero in the set of all color in Color space is the same. These distances are displayed in window (37). The HVC value for any color in the set of all colors identified in the Color space that satisfies the specified proportional relationship is termed Color Zero and this value appears in the window labeled (35). Window (36) contains two of the colors selected in Page (20) and Color Zero and serves to assist the artist to conceptualize whether or not the contrast relationships between the various colors they are working with on Palette (34) work together harmoniously.

The Color Selection Page (20) and the Results Manager Page (30), described above with reference to FIGS. 2 and 3 respectively, are utilized by an artist to conduct an efficient and accurate eight step color selection process. This color selection process will now be described with reference to FIG. 4. At Step 1, the artist moves the Color Section Selection Pointer (27*a*) on Color Wheel (22) to a position on the Color Wheel that corresponds to the hue they would like to select for a palette. The hue value is displayed in Color Wheel Position box (23) as Red 2.5, for instance. The hue page that the Pointer (27*a*) points to is then displayed in the Hue Page Display window (21) as Hue Page (21*a*). At Step 2, the artist selects a first color by moving the cursor on the computer monitor to Color Selection window (25) and selecting it and then selecting a color on the Hue Page (21*a*) by moving the cursor to point to the desired HVC value and selecting it. The selected color appears in the Color Selection window (25) as a swatch of color, the HVC value for the selected color appears in window (25*a*), and the selected color also appears in color circle one of the Selected Colors window (24). For instance, the selected HVC value for color one could be R2.5, 5.5, and 12.75 and this value appears in the HVC value window (25*a*).

Figure 4:
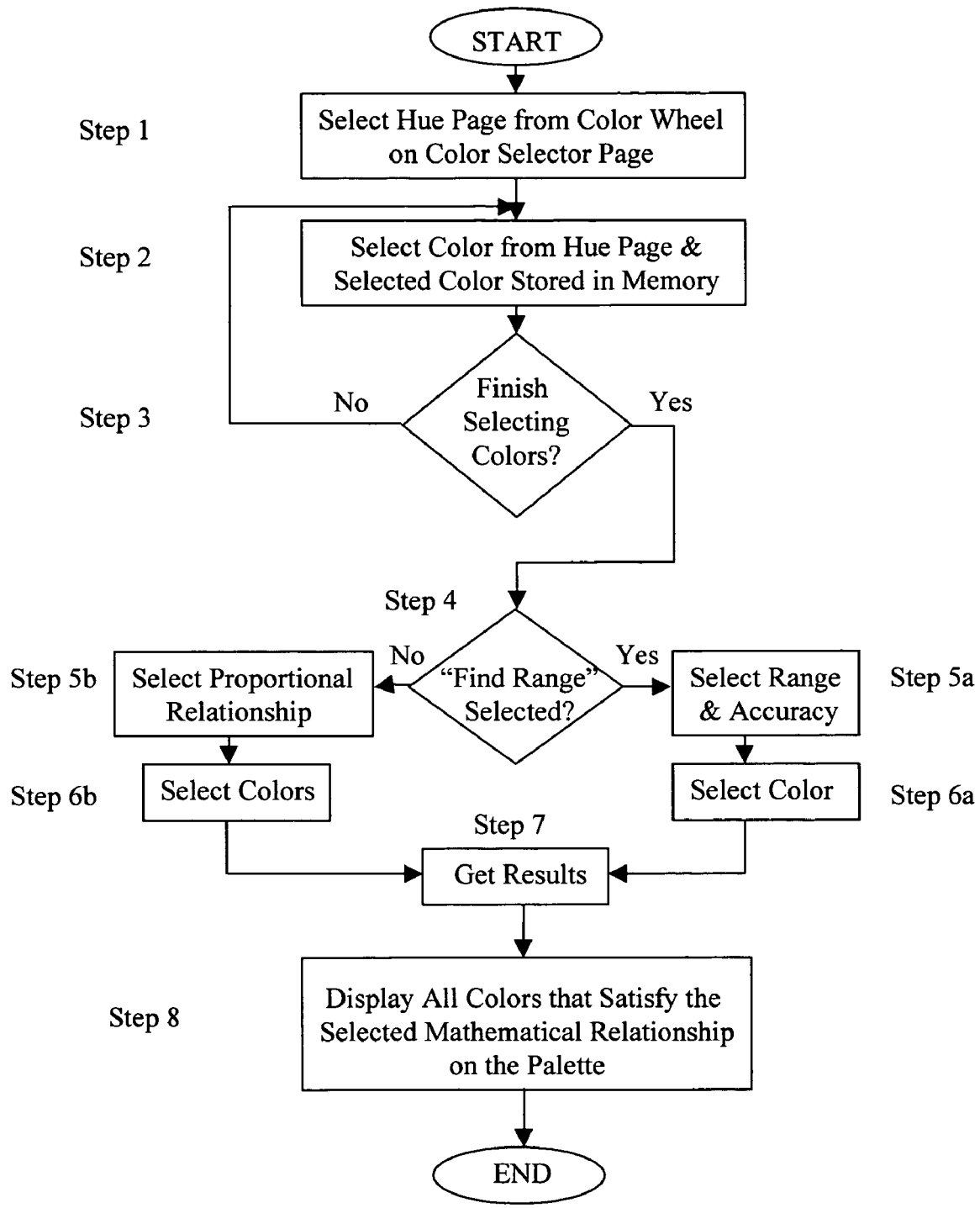
FIG. 4 is a logical flow diagram of the Color Selection process.

Continuing to refer to FIG. 4, the artist decides whether or not to select a second color, if the artist elects to select a second color, the process returns to Step 2 and the artist selects a second color value for the palette in the same manner as the first color was selected. The HVC value of the second selected color could be for instance, B 3, 8, and 6.625, and is displayed in HVC Value window (26*a*). The second selected color is displayed in the Color Selection window (26) and in color circle two in Selected Colors window (24). I have constructed the Color Selection Page (20) such that an artist can select up to six colors in the above fashion, but my invention should not be limited only to the selection of up to six colors as I could have constructed this page to permit the artist to select more than six colors. If after selecting the second color the artist decides that they do not want to select another, the process proceeds to Step 4.

In Step 4 of FIG. 4, the artist decides which of the two contrast relationships, either the "Find Range" function in window (31*a*) or the "Find Proportion" function in window (32*a*), they wish to select. This decision is typically based on the artists experience with the modified Color space and whether the artist is creating a palette from one or two colors. The "Find Range" function would typically be selected if the artist was only interested to explore color relationships to one color and the "Find Proportion" function would be used if the artist was interested to explore a particular relationship that two colors have to a plurality of other colors. If the "Find Range" function is selected the artist proceeds to Step 5*a* and if "Find Proportion" is selected the artist proceeds to Step 5*b*. Assuming that "Find Range" is selected, at Step 5a the artist proceeds to specify a Range, shown in window (31*b*), in numbers of steps from color one. The specified Range could be any number that enables the Color Selector to identify and display at least one color from the modified Color space. The Range could be, for instance, five. The Range defines the set of all colors in the modified Color space that are the specified number of steps from the selected color. Also in Step 5*a*, the artist can elect to specify the accuracy with which they wish to display the resulting set of colors.

The Accuracy function appears in the window labeled (33) in FIG. 3. As with Range, Accuracy can be specified to be any number that enables the Color Selector to identify and display at least one color from the modified Color space. So, for instance, Accuracy can be specified to be 0.1 steps. More specifically, the set of all colors in the modified Color space that are identified as the result of specifying the Range to be five steps and the Accuracy to be 0.1 steps are from four and nine-tenths to five and one-tenths steps from the selected color. This set of all colors is displayed in Palette (34) and I will describe how this set of colors is identified later in this application. The Accuracy function has the effect of increasing or decreasing the number of colors displayed in the Palette (34) in the set of all colors in the modified Color space.

In Step 6*a* of FIG. 4, the artist selects one of the two colors that were selected earlier in Step 2 of the process. For the purpose of this description, I will assume that the artist selects Color One, which has the value R 2.5, 5.5, 12.75. After selecting a color, the artist, in Step 7, enables the "Get Results" function located in window (29) of FIG. 2 and the resulting set of colors are displayed, in Step 8, on the Palette (34) in FIG. 3.

Returning now to Step 4 of FIG. 4, in the event that the artist selects the "Find Proportion" function (32*a*), then the color selection process proceeds to Step 5*b*. At this point, the artist enters a number, in the area labeled (39) in window 32*b*, to complete the specification of a proportional relationship they would like between the colors selected with reference to FIG. 2, and the Palette (34) of colors in FIG. 3. As with the Range and Accuracy specifications, this number can be any number that results in the identification and display of at least one color from the set of all colors in the Color space. For the purpose of this description we should assume that the specified proportion is one-to-one (1::1). Also, at Step 5*b* the artist may specify the Accuracy similar to the manner in which it was specified in Step 5*a*. At Step 6*b*, the artist selects two colors from among the colors already selected with reference to FIG. 2 and enters these colors in the spaces labeled (40) and (41). Again, for the purpose of this description we should assume that the artist selects Color One and Color Two for spaces (40) and (41) respectively. Next, the artist would invoke the "Get Results" function (29) in FIG. 2 and the resulting set of colors are displayed on the Palette (34) in FIG. 3.

So, for instance, if the first color selected, Color One, has a value of R 2.5, 5.5, 12.75 and the second color selected, Color Two, has a value of B3, 8, 6.625 then one of the colors in the set of all colors in the modified Color space that satisfies the specified one-to-one proportional relationship has a value of Y 2.5, 7, 12. This color is called Color Zero and its HVC value will appear in the window labeled (35). Further, the distances between Color Zero and the first selected color and Color Zero and the second selected color is 14.57 and 14.59 steps respectively and both of these distances will appear in the window labeled (37). Note that the two distances are not exactly the same; however, they are well within the accuracy of 0.1 steps specified by the artist. I will describe how the Color Selector identifies the set of all colors in the modified Color space that satisfy the specified proportional relationship in detail later in this application.

Figure 5:
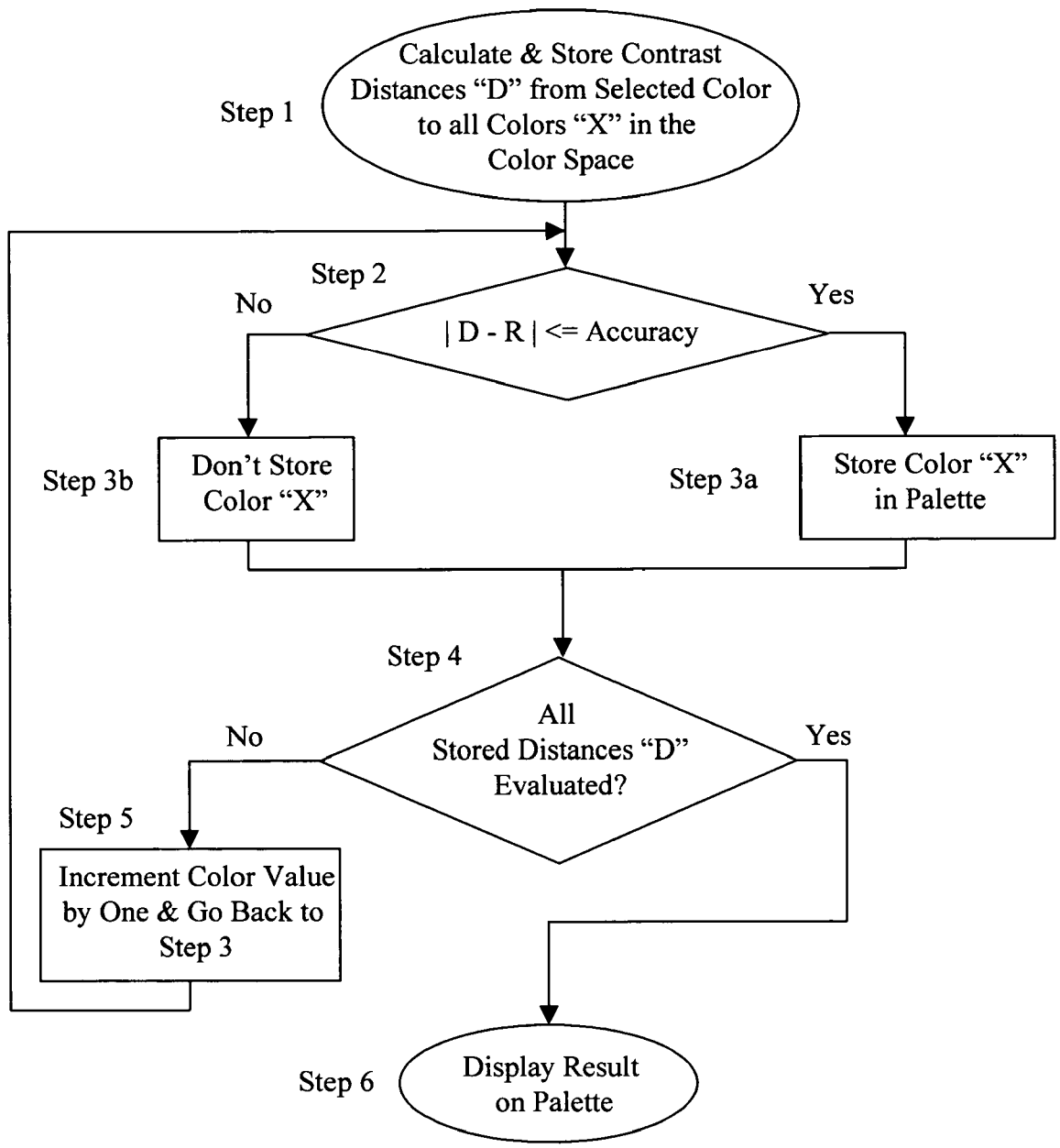
FIG. 5 is a logical flow diagram of the Find Range function operation.

As mentioned previously with reference to FIG. 4, the "Find Range" function (31a) operates to identify all colors in the Color space that are within a specified distance of a color selected by an artist. In order for the "Find Range" function to operate, the artist must first complete those steps of the Color Selection process described in FIG. 4 up to and including Step 7. I will now describe how this function operates with reference to FIG. 5. At Step 1, the "Find Range" function proceeds to calculate and store the contrast distances from the selected color, Color One for instance, to all of the other colors "X" in the Color space. An equation 1.01 is used to calculate contrast distances and is disclosed later in this application. [Contrast distances are calculated using equation 1.1 in incorporated application Ser. No. 10/862,230.] As previously mentioned, Color One has an HVC value of R 2.5, 5.5, 12.75. The method as well as the increments used to search through all of the colors in the Color space is not important to the operation of my invention. I elected to start searching in the Hue page containing the selected color, which in this case is the page containing all of the colors associated with R 2.5. So, for instance, I start at the lowest value and chroma on the R 2.5 hue page and work upwards in value and chroma, in increments of one step, skipping the selected color, one, until all of the contrast distances between the selected color and all off the other colors "X" are evaluated. All of these contrast distances "D" are saved in computer memory as $D^o, D^1, D^2 \ldots D^n$. The searching process then moves on to the next hue page, which in this case contains all of the colors associated with R 2.6. In Step 2, the function utilizes equation 1.0 to evaluate the first distance "$D^o$" saved in memory to determine whether or not to include the Color "X" associated with the first distance in the set of all colors in the Color space to be displayed in the Palette (34). If the first distance $$|D-R| \leq \text{Accuracy} \qquad \text{Eq. 1.0}$$

"$D^o$" meets the range and accuracy specification selected by the artist, then the Color "X" associated with the first distance is stored in computer memory in Step 3a. On the other hand, if the first distance does not meet the range and accuracy specification selected by the artist, then the Color "X" is not stored in the computer memory at Step 3b and the process proceeds to Step 4. In the preferred embodiment of my invention, Steps 1 and 2 are combined such that each contrast distance is calculated and then immediately evaluated using equation 1.0. In Step 4, the process determines whether or not all of the stored Distances "D" have been evaluated. If so, the process proceeds to Step 6 and the results of the process are displayed in the Palette (34), if not, the process returns to Step 2 and evaluates the next Distance "$D^1$" and so forth until all of the stored Distances have been evaluated at which point they would be displayed in the Palette (34). Finally, artists tend to be more interested in finding colors that are a specified distance from one another, and so the "Find Range" function is very useful for this purpose.

In order to practice the preferred embodiment of my invention, it is necessary to be able to quantify color distances between any two colors within the modified color space (3). For the purposes of this application, the term color distance and color contrast have equivalent meanings. A color contrast is defined to be the quantified magnitude of the visual quality of contrast that is generated when two colors touch each other. It can also be thought of as the quantified visual difference between the two touching colors, or the quantified strength of the border separating the two touching colors. I have defined a unit of color contrast to be equivalent to one chroma step, which could be for instance the step (14a) of FIG. 1c. Steps, as a measurement of color distance, progress arithmetically, i.e., where one step is the unit step, ½ step is half the distance, two steps is twice the distance, and so on.

Color distance is evaluated in the modified color space (3) much as the distance between two points would be resolved in three-dimensional physical space. The distance between two colors is resolved by first evaluating the distances between the two color's hues, values and chromas respectively, and then evaluating the Pythagorean formula using those three distances. As mentioned previously, equation 1.01 is used to evaluate color distances.

$$\text{Total Color Distance} = \sqrt{[(\text{hue distance})^2 + (\text{value distance})^2 + (\text{chroma distance})^2]} \qquad \text{Equation 1.1}$$

As previously discussed, the unit step, or the color distance that is equivalent to one step, is the distance between two colors that differ by one chroma increment. In other words, one color distance step is equivalent to one chroma step.

It is important to understand how the steps of the value axis (Y) and the hue axis (Z) relate to the steps of the chroma axis when evaluating color distance. As mentioned previously with reference to FIG. 1d, under the distance notation of the modified color space (3), one step along the value axis (Y) is equivalent to eight chroma steps, thus one value step equals eight steps. When calculating the value distance and the chroma distance before executing the equation 1.01, the following two equations 1.02 and 1.03 are used, where value1 and chroma1 belong to a first color which is point (18a) located in the modified color space (3) of FIG. 1e and value2 and chroma2 belong to second color which is a point (18b) located in the color space (3) of FIG. 1e.

$$\text{value distance} = (|\text{value1} - \text{value2}|)(8) \qquad \text{Eq. 1.02}$$

$$\text{chroma distance} = |\text{chroma1} - \text{chroma2}| \qquad \text{Eq. 1.03}$$

The hue axis relates to the chroma axis in a special way. First, because it is cyclical, the hue distance between two colors can only be as great as that created by two opposite hues, or two hues at opposing ends of the spectrum. Second, distance between hues is strengthened or diminished as the chroma of one or both the colors increases or decreases. But before chroma is considered in the total hue distance, there must be a means for evaluating the basic distance between hues independent of chroma.

As mentioned with reference to FIG. 1b, the common convention is to divide the hue axis into 40 groups and it is convenient to assign the difference between each group to be one basic hue step, for example, the difference between R 2.5 and R 5. For the purpose of mathematically resolving the basic hue distance with some degree of nuance, it is convenient to assign numbers to each hue desired. For many practical purposes, a scale of 1000 hues is suitable, numbered 1 through 1000. This way, 100 hues are assigned to each of the 10 groups, where 1–100 are R 0.1–R 10.0, 101–200 are YR 0.1–YR 10.0, 201–300 are Y 0.1–Y 10.0, and so on. The number associated with a hue can be calculated, given a set of group numbers which correspond to the ten hue groups, for example R=0, YR=100, Y=200, GY=300, G=400, BG=500, B=600, PB=700, P=800, RP=900, and given the secondary number, for example 2.5, 5, 9.4, etc. Equation 1.04 is used to calculate the hue number.

hue number=(group number)+(secondary number) (10)    Eq.1.04

Using equation 1.05, the basic hue distance between colors can then be calculated by taking the difference between two hue numbers, and dividing by the hue number which reflects the difference between 2 adjacent hues in a 40 part spectrum (the difference between R 2.5 and R 5). The divisor is equivalent to the hue number for R 5 (50) minus the hue number for R 2.5 (25) which is 25 in this case.

basic hue distance=|hue number 1−hue number 2|/25    Eq. 1.05

However, since the hue axis is cyclical, the basic hue distance cannot exceed the distance between a hue and its opposite, e.g., between R 2.5 and BG 2.5. Any distance in excess of that distance should be smaller than the distance by the exact amount it exceeds the distance by. In the case of the opposite hues R 2.5 and BG 2.5, the basic hue distance is 20. Thus any distance which exceeds 20 should be subtracted from 40, the total distance around the spectrum, to arrive at the adjusted basic hue distance. Equation 1.06 is used to arrive at the adjusted basic hue distance.

adjusted basic hue distance=40−basic hue distance    Eq. 1.06

Once the adjusted basic hue distance is evaluated, the total hue distance must be evaluated based on the chroma positions of both colors, since the magnitudes of the chromas of both of the colors influence the magnitude of the total hue distance. To arrive at a formula for total hue distance, it is important to know the chroma position which both colors must have in order for the total hue distance to be equivalent to the adjusted basic hue distance. In many cases, and for the purposes of my invention, this chroma position is twelve. That is, when two colors both have a chroma of twelve, the total hue distance equals the adjusted basic hue distance. When both chroma positions remain the same, the total hue distance increases or decreases with the chroma arithmetically. That is, when the two chromas are 6, the hue distance is half the basic hue distance, and when the chromas are twelve, the hue distance is double. It should be understood, that I selected a chroma position of twelve as a convenience for constructing the modified color space (3) and that a higher or lower chroma position could have been selected whereby two colors having this chroma would result in the total hue distance equaling the adjusted basic hue distance. Equation 1.07 calculates the total hue distance between to colors having the same chromas.

total hue distance=(adjusted basic hue distance) (chroma/12)    Eq. 1.07

In order to calculate the total hue distance between two colors when the two chroma positions differ, it is necessary to determine what single chroma position is needed to evaluate the total hue difference. Logically, this is the average of the two chroma positions. However, it is true that there is no hue distance when one of the colors is gray, or has a chroma of zero, and that the hue distance diminishes arithmetically as one of the chromas progresses towards zero. This being the case, an average of the two chromas is insufficient, and must be modified by a factor represented by the ratio between the lower chroma and the higher chroma. In other words, the single chroma position at which the hue distance will be evaluated is equal to the average of the chromas multiplied by the lower chroma divided by the higher chroma. For such a case, equation 1.08 is used to calculate the adjusted chroma.

adjusted chroma=((lower chroma+higher chroma)/2) (lower chroma/higher chroma)    Eq. 1.08

Equation 1.08 is perfectly effective when the lower chroma equals the higher chroma. When both chromas equal zero, the adjusted chroma is zero. When the chromas of two colors are different, the adjusted chroma is used in place of the "chroma" term in equation 1.09 to evaluate the total hue distance. This gives us equation 1.09 below.

total hue distance=(adjusted basic hue distance)(adjusted chroma/12)    Eq. 1.09

Figure 6:
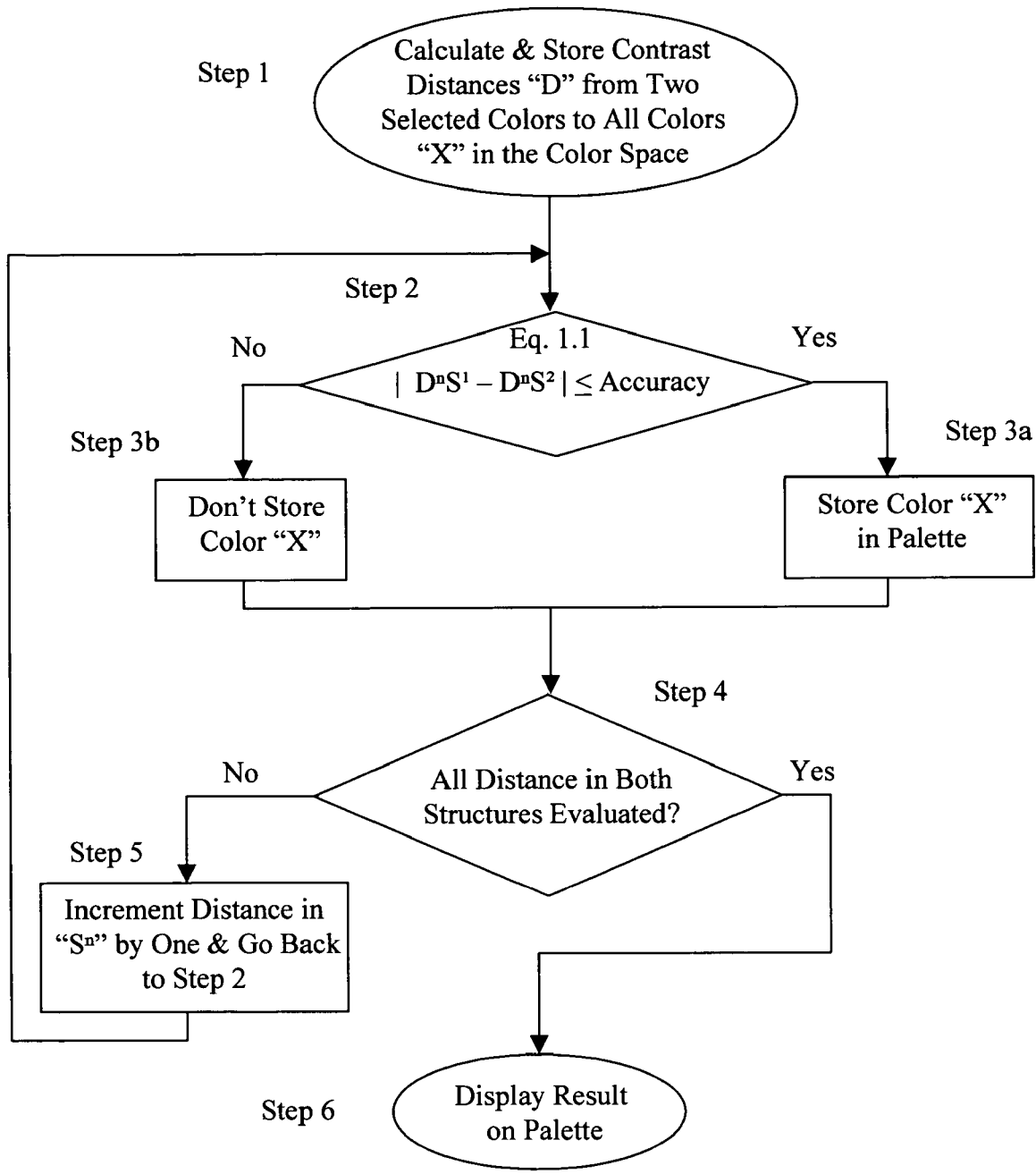
FIG. 6 is a logical flow diagram of the Find Proportion function operation.

As mentioned previously with reference to FIG. 4, the "Find Proportion" function (32a) operates to identify all colors in the modified Color space that satisfy a proportional relationship, specified by an artist, between two of the colors selected with reference to FIG. 2, and the Palette (34) of colors. In order for the "Find Proportion" function to operate, the artist must first complete those steps of the Color Selection process described in FIG. 4 up to and including Step 7. I will now describe how this function operates with reference to FIG. 6. In Step 1, the "Find Proportion" function calculates and stores contrast Distances "D" from two selected colors, which could be for instance the Colors One and Two mentioned previously, to all of the colors "X" in the modified Color space. More specifically, the function first evaluates the distances "D" between Color One and the remaining colors in the modified color space, as described previously with reference to Step 1 in FIG. 5, and stores the resulting distances in memory in a structure "$S^1$". The function then proceeds to evaluate the distances between Color Two and the remaining colors in the modified Color space in the same fashion as for Color One. The distances resulting from this evaluation are stored in memory in a structure "$S^2$". In Step 2, the first stored distance in structure "$S^1$" ("$D^\circ S^1$") is subtracted from the first stored distance in structure "$S^2$" ("$D^\circ S^2$") and the absolute value of this quantity is evaluated against the specified accuracy. If this quantity is less than or equal to the specified accuracy, the color "X" common to both distances is stored in memory. If, on the other hand, this quantify is not less than or equal to the specified accuracy, the color "X" common to both distances is not stored and the process continues to Step 4. Equation 1.1 is used to make this calculation.

$|D^n S^1 - D^n S^2| \leq$ Accuracy    Eq. 1.1

In Step 4, the process determines whether or not all of the distances in both structures have been evaluated, if this is not the case then in Step 5, the distance in the current set of colors is incremented by some amount and the process returns to Step 2. At Step 2, the first stored distance in structure "$S^1$" ("$D^\circ S^1$") is subtracted from the second stored distance in structure "$S^2$" ("$D^1 S^2$") and the absolute value of this quantity is evaluated against the specified accuracy. If this quantify is less than or equal to the specified accuracy, the color "X" common to both distances is stored in memory. If, on the other hand, this quantify is not less than or equal to the specified accuracy, the color "X" common to both distances is not stored and the process continues to Step 4. If the process determines that all of the distances in both structures have been evaluated, then the colors "X" stored in memory are displayed in the Palette (34).

At this point in the Color Selection process, the artist may have selected a sufficient number of colors and created a sufficient number of palettes to start experimenting with harmonious color combinations in window (36) of the Results Manger page (30). The artist can easily modify any of the specified ranges, proportions, or accuracies as described with reference to FIG. 4, in order to create different palettes from which to work. Alternatively, the artist can use the Composition Manger (70) illustrated in FIG. 7 to experiment with the colors they select and the palettes they create. The Composition Manager is not intended to be used as a tool to create a color image as much as it is a tool to experiment with color harmonies. As I mentioned earlier in this application, an artist can use the composition management tools commercially available from either Adobe or Corel, for instance, to assist with the creation of a color image. But generally speaking, both the Composition Manger (70) and the Adobe or Corel tools allow the artist to experiment with color harmonies.

I will now describe the operation of the Composition Manager (70) with reference to FIG. 7. As mentioned briefly in the preceding paragraph, the Composition Manager is a tool that the artist can use to experiment with color harmony using the colors they have selected in the Color Selection Page (20), discussed with reference to FIG. 2, and the using the colors in the Palette (34) they created as discussed with reference to FIG. 3. More specifically with reference to the Color Manger (70) in FIG. 7, Composition Window (71) is used by the artist to experiment with color harmonies using the colors they select and the palettes they create. The artist can create a plurality of Main Swatches (74a) and (74b) in Window (71) and select colors for these swatches from among the selected colors or the palette colors. For example, the artist could place Color One (R 2.5, 5.5, 12.75) and Color Two (B 3, 8, 6.625), selected with reference to FIG. 2, in Main Swatches (74a) and (74b) respectively. The Main Swatches are created by using the computer mouse to select "Main Swatch" in the window labeled (72), selecting "Make New" in the window labeled (73). This operation by the artist places a Swatch in Window (71). Once created, the artist can then select a color for the Swatch by using the mouse to select the Swatch, then going to either the Color Selection Page (20) in FIG. 2 to select one of the plurality of colors in Window (24), or the artist can go to the Results Manager Page (30) and select one of the plurality of colors from the Palette (34). This results in the selected color appearing in the selected Swatch. Continuing to refer to FIG. 7, the artist can also create a plurality of External Swatches A, B, and D associated with the Main Swatches (74a) and (74b). Once created, the artist can select colors to appear in these External Swatches in the same manner as colors were selected for the Main Swatches. The artist can also create a plurality of Internal Swatches as illustrated by the Internal Swatch (C) in Main Swatch (74a). A color can be selected for this Internal Swatch in the same manner as colors are selected for the other Swatches. Also, with reference to Window (71) the artist can select one or more colors for the "Field" of the composition. The "Field" represents the background color or colors upon which the Swatches are placed. The color for the "Field" is selected by using the mouse to select "Field" in Window (72), selecting "Make New" in Window (73), and then selecting a color in the same manner as colors were selected for the Swatches. One or more "Fields" can be created in this manner. Having created and selected colors for the "Field", the Main, External, and Internal Swatches, the artist can then move the positions of the Main Swatches with relation to each other and/or move the positions of the External or Internal Swatches with relationship to each other. So, for instance, the artist can use the Composition Manger to move the Main Swatches so as to be touching each other or not, the artist can move the External Swatches on any Main Swatch so that any two can be touching or not, and the artist can effect the same positional relationship with reference to the Internal Swatches.

Now having completed the description of the preferred embodiment of my inventive Color Selection method, it will be appreciated by those skilled in the art that this description is not intended to limit the scope of my invention, but serves only to illustrate a few of the methods which could be used to efficiently and accurate select colors for a color palette

I claim:

1. In a general purpose computer system including hardware and software, a method for selecting colors for a color palette used to create a color image, the method comprising the steps of:

selecting at least one color from a plurality of colors in a modified color space;

specifying a contrast relationship which operates on the at least one selected color to identify a plurality of colors in the modified color space; and displaying all of the plurality of colors identified in the modified color space that satisfy the specified contrast relationship.

2. The modified color space of claim 1 is constructed such that contrasts are all the same among a plurality of neighboring colors on the same hue page and neighboring colors on different hue pages and chroma have a steady, linear rate of change with contrast reaching zero at the neutral axis.

3. The method of claim 1, wherein the specified contrast relationship comprises selecting a contrast relationship function and specifying at least one palette characteristic.

4. The method of claim 3, wherein the selected contrast relationship function is one of a range function and a proportionality function.

5. The method of claim 3, wherein the specified palette characteristic is at least one of a range step, a proportionality relationship between three colors, and accuracy.

6. In a general purpose computer system including hardware and software, a system for selecting colors for a color palette used to create a color image, the system comprising:

means for selecting at least one color from a plurality of colors in modified color space;

means for specifying a contrast relationship which operates on the at least one selected color to identify a plurality of colors in the modified color space; and means for displaying all of the plurality of colors identified in the modified color space that satisfy the specified contrast relationship.

7. The modified color space of claim 6 is constructed such that contrasts are all the same among a plurality of neighboring colors on the same hue page and neighboring colors on different hue pages and chroma have a steady, linear rate of change with contrast reaching zero at the neutral axis.

8. The system of claim 6, wherein the means for specifying the contrast relationship comprises means for selecting a contrast relationship function and means for specifying at least one palette characteristic.

9. The system of claim 8, wherein the selected contrast relationship function is one of a range function and a proportionality function.

10. The system of claim 8, wherein the specified palette characteristic is one of a range step, a proportionality relationship between three colors, and accuracy.

* * * * *